Patented Aug. 26, 1930

1,774,092

UNITED STATES PATENT OFFICE

HARRY B. GOODWIN, OF GRAND JUNCTION, COLORADO, ASSIGNOR TO THE LATIMER-GOODWIN CHEMICAL COMPANY, OF GRAND JUNCTION, COLORADO, A CORPORATION OF COLORADO

EMULSION AND METHOD OF MAKING SAME

No Drawing.  Application filed September 30, 1926.  Serial No. 138,808.

This invention relates to emulsions of materials normally immiscible, and more particularly emulsions of the oil-in-water type. In certain industrial usages, for instance in spray emulsions for horticultural purposes, it has been the practice to emulsify petroleum oils by means of soaps, more especially soft soaps made up with potash and fish oils. While satisfactory from the manufacturing standpoint such emulsifiers introduce a difficulty in that the soap reacts chemically with many substances, and notatably with the lime in hard water; and if such an emulsion be applied to vegetation which has previously been sprayed with lime-sulphur wash for example, the emulsified condition of the oil is destroyed. With the aim of obviating such difficulty, other agents, such as glue, casein, clays, etc., have been tried, but other disadvantages result, viz., increased cost, liability to bacterial decomposition, or lack of permanence: An emulsifier which is not liable to chemical change with other agents, and which is permanently stable, and yet not expensive, is accordingly highly desirable.

To the accomplishment of the foregoing and related ends, the invention, then, consists in the features hereinafter fully described, and particularly pointed out in the claims, the following description setting forth but one of the various ways in which the principle of the invention may be applied.

In accordance with my invention, emulsions are made up with certain substances known as gum-resins, for instance olibanum and in particular gamboge. Gamboge, also sometimes known as gambooge, is the inspissated juice of several species of the guttiferous genus Garcinia, the gamboge of commerce being mainly obtained from the species *G. hanburii*, in Siam, Cambodia and Cochin China. Heretofore this gum-resin has been known especially as a water-color paint pigment but I have found that among other properties it has very effective emulsifying power when properly applied.

Preferably there is initially added to the gamboge a quantity of alcohol, then a small amount of the oil to be emulsified, and enough water to form a creamy emulsion. Addition of oil and water are continued until the total amount of both have been incorporated. Vigorous stirring during the addition of the different ingredients facilitates the process. A small amount of strong ammonia is added, best after the other ingredients, and only enough is needed such as to impart a faintly perceptible odor. In some instances, I also contemplate instead of ammonia, the use of fixed alkalies, such as soda; and to avoid undesirable excess, control may be had in any convenient manner, as for instance by testing with phenolphthalein.

The alcohol used may be ethyl, denatured or not, methyl or a higher alcohol, as convenient.

As an illustration of the features of my invention, as it may be employed in the preparation of an oil-in-water emulsion, procedure may be as follows: A refined petroleum oil, such as a white oil of specific gravity .891 may be readily emulsified, using proportions of ¼ oz. by weight of gamboge, and 7½ fluid oz. of alcohol, mixing vigorously, and adding gradually thereto one gallon of the oil and 15½ fluid oz. of water. Finally, a small amount of ammonia water is added until the odor thereof is faintly perceptible. Such emulsion is fluid enough to flow readily, and contains about 84% of oil by volume, and is canary yellow in color. Further dilution in water can be carried out even to a dilution containing less than 1% of oil.

Similarly, less highly refined oils may be used, including crude petroleum, likewise non-mineral oils, such as whale oil for instance.

An emulsion of this character may be used where desired with insecticides or fungicides irrespective of any possible lime content, and in fact it may be used as a spray soon after prior usage of lime sulphur water if necessary and without any detriment.

For cutting oils and the like, the same principle may be applied as above set forth, and in such usage there is in accordance with my invention a distinct advantage in that a strong emulsion can be made up and this can be further diluted at the point of use, without liability of damage to the emulsion from use of water with a high lime content.

Other modes of applying the principle of the invention may be employed, change being made as regards the details disclosed, provided the steps or ingredients stated by any of the following claims or the equivalent of such be employed.

I therefore particularly point out and distinctly claim as my invention:—

1. A method of preparing emulsions, which comprises incorporating a small proportion of a gum-resin and an alkali with oil and water to form an oil-in-water emulsion.

2. A method of preparing emulsions, which comprises incorporating a small proportion of gamboge and an alkali with oil and water to form an oil-in-water emulsion.

3. A method of preparing emulsions, which comprises incorporating a small proportion of a gum-resin, an alkali and an alcohol with the ingredients to be emulsified.

4. A method of preparing emulsions, which comprises incorporating a small proportion of gamboge, an alkali and an alcohol with the ingredients to be emulsified.

5. A method of preparing emulsions, which comprises mixing a gum-resin and an alcohol, and admixing an oil and an alkali and water.

6. A method of preparing emulsions, which comprises mixing gamboge and an alcohol, and admixing an oil and an alkali and water.

7. A method of preparing emulsions, which comprises mixing a gum-resin and an alcohol, admixing an oil and water, and adding a small amount of an alkali.

8. A method of preparing emulsions, which comprises mixing gamboge and an alcohol, admixing an oil and water, and adding a small amount of ammonia.

9. An emulsion comprising a gum resin, an alkali, oil and water.

10. An emulsion comprising gamboge, oil, an alkali and water.

11. An emulsion comprising a gum-resin, an alcohol, oil, water and alkali.

12. An emulsion comprising gamboge, an alcohol, oil, water and ammonia.

13. An emulsion comprising a gum-resin, an alcohol, a petroleum oil, water and alkali.

14. An emulsion comprising gamboge, an alcohol, a petroleum oil, water and ammonia.

15. An emulsion comprising gamboge, an alcohol, an alkali, oil and water.

16. An emulsion comprising a gum-resin, an alcohol, oil, water and ammonia.

Signed by me this 25th day of September, 1926.

HARRY B. GOODWIN.